United States Patent [19]
Shervington et al.

[11] Patent Number: 6,064,121
[45] Date of Patent: May 16, 2000

[54] AXIALLY COMPACT GENERATOR SET AND REFRIGERATION SYSTEM EMPLOYING THE SAME

[75] Inventors: Roger M. Shervington; Hassan Mansir, both of Rockford; John Hefter, Loves Park, all of Ill.

[73] Assignee: Hamilton Sundstrand Corporation, Rockford, Ill.

[21] Appl. No.: 09/032,481

[22] Filed: Feb. 27, 1998

[51] Int. Cl.[7] .............................. H02K 1/27; H02P 9/00
[52] U.S. Cl. .................. 290/1 A; 322/1; 310/268
[58] Field of Search .......................... 290/1 A, 32, 40 R; 322/1, 7, 4; 310/268, 266

[56] References Cited

U.S. PATENT DOCUMENTS

| | | | |
|---|---|---|---|
| 2,251,732 | 4/1941 | Thomas | 64/13 |
| 3,604,965 | 9/1971 | Stroud | 310/155 |
| 3,999,092 | 12/1976 | Whiteley | 310/156 |
| 4,163,367 | 8/1979 | Yeh | 60/414 |
| 4,237,396 | 12/1980 | Blenkinsop et al. | 310/154 |
| 4,371,801 | 2/1983 | Richer | 310/156 |
| 4,510,409 | 4/1985 | Kanayama | 310/268 |
| 5,079,461 | 1/1992 | Schluter et al. | 310/67 A |
| 5,181,541 | 1/1993 | Bodenheimer | 137/899 |
| 5,625,276 | 4/1997 | Scott et al. | 322/24 |
| 5,739,675 | 4/1998 | Green et al. | 322/1 |
| 5,786,645 | 7/1998 | Obidniak | 310/68 R |

*Primary Examiner*—Nicholas Ponomarenko
*Attorney, Agent, or Firm*—Wood Phillips VanSanten Clark & Mortimer

[57] ABSTRACT

Axial compactness is achieved in a generator set including an internal combustion (10) having a main shaft (16) journalled for rotation about an axis (56) and having an end (18, 54) with a flywheel (20) mounted on the end. A first rotatable magnet assembly (21) having axially facing poles is disposed on the flywheel (20) and a stator (24, 72) including generator windings (102, 104) is provided adjacent the magnets (21). A second rotatable magnet assembly (21, 22) is opposite the first magnet assembly (21) and adjacent the stator (24, 72) and has axially facing poles directed toward the poles on the first magnetic assembly (21) and is coupled to the first magnetic assembly for rotation therewith.

12 Claims, 5 Drawing Sheets

AXIALLY COMPACT GENERATOR SET AND REFRIGERATION SYSTEM EMPLOYING THE SAME

FIELD OF THE INVENTION

This invention relates to generator sets, and more specifically, to an axially compact generator set. The invention also relates to a refrigeration system employing an axially compact generator set.

BACKGROUND OF THE INVENTION

Generator sets typically employ an internal combustion engine, such as a diesel engine, and a generator, such as a radial gap generator. These generator sets are employed in a multitude of differing environments for generating electrical power. Where a typical radial gap generator is employed, the generator set will have a substantial axial length. For example, in many cases, the rotor shaft of the generator is directly coupled to the main shaft of the engine. The axial length of the set then is the total of the length of the engine plus the length of the generator. Because radial gap generators are typically relatively elongated in the direction parallel to the axis of rotation, it is necessary that the generator rotor be mounted in bearings at one or both ends of the rotor which further increases the axial length of the generator, and thus the length of the generator set.

To adapt such sets to environments where long axial lengths cannot be tolerated, attempts have been made to offset the axis of rotation of the generator from the axis of rotation of the engine and couple the two via gears or belts. While such constructions avoid the problem of excessive axial length, reliability and/or weight problems are introduced by reason of the need for belts and/or gears to transmit power from the engine to the generator. Maintenance requirements in such systems are also increased as a result.

One typical usage of a generator set where axial compactness, high reliability and low maintenance are desired is in a mobile refrigeration unit. For example, such generator sets are often used in refrigerated trailers to provide electrical power to drive a compressor for a vapor compression refrigeration system. Not infrequently, the system components are relatively inaccessible, making it highly desirable that the system be extremely reliable with low maintenance requirements.

The present invention is directed to overcoming the above problems by providing an axially compact generator set where the generator may be directly coupled to an internal combustion engine and which is ideally suited for, but not limited to, use as a source of electrical power for a mobile refrigeration unit.

SUMMARY OF THE INVENTION

It is the principal object of the invention to provide an axially compact generator set. More specifically, it is an object of the invention to provide an axially compact generator set for use in, for example, a mobile refrigeration unit.

An exemplary embodiment of the invention achieves the foregoing object in an axially compact generator set that includes an internal combustion engine having a main shaft journalled for rotation about an axis and having an end. A flywheel is disposed on the shaft and a first, rotatable magnet assembly having axially facing poles is disposed on the flywheel. A stator includes generator windings adjacent to the first magnet assembly and a second, rotatable magnet assembly is disposed on the side of the stator opposite the first rotatable magnet assembly and adjacent to the stator. The second magnet assembly has axially facing poles directed toward the poles on the first magnet assembly and is coupled to the first rotatable magnet assembly for rotation therewith.

In a preferred embodiment, the engine has main bearings journalling the main shaft. The main bearings further serve to journal the flywheel and both the first and second magnet assemblies.

In a preferred embodiment, the magnet assemblies are made up of permanent magnets.

Preferably, the stator generator windings define a polyphase machine such as a three-phase generator.

The invention further contemplates that the flywheel include a starter gear. In one preferred environment of use of the invention, an axially compact generator set as described above, is incorporated in a refrigeration system including an electrically driven, refrigerant compressor which is electrically coupled to the stator. A refrigerant condenser is connected to the compressor to receive compressed refrigerant therefrom and an electrically driven fan for driving air through the condenser is electrically coupled to the stator.

According to another aspect of the invention, an axially compact generator set is provided and includes an internal combustion engine having a main shaft journalled by main bearings for rotation about an axis. The shaft has an end and a generally cylindrical ferromagnetic disc is mounted on the end and extends radially outwardly therefrom. The disc has sufficient mass to act as the flywheel for the engine. A plurality of permanent magnets are carried by the disc and have north and south poles facing in axially opposite directions with dissimilar poles of adjacent magnets facing in the same direction. A stator is axially spaced from but adjacent to the disc and is separated from the permanent magnets by an axial air gap. A plurality of electrical windings are disposed on the stator and are located in a common plane.

Preferably, there are two of the discs axially spaced from one another with the stator located between the discs. Each of the discs carries a plurality of the permanent magnets with the poles on one of the discs aligned with and facing the opposite poles of the magnets on the other disc.

A highly preferred embodiment contemplates a provision of a bell housing secured to the engine to house the disc with the stator being mounted on the bell housing.

Other objects and advantages will become apparent from the following specification taken in connection with the accompanying drawings.

DESCRIPTION OF THE PREFERRED EMBODIMENT

Figure 1:
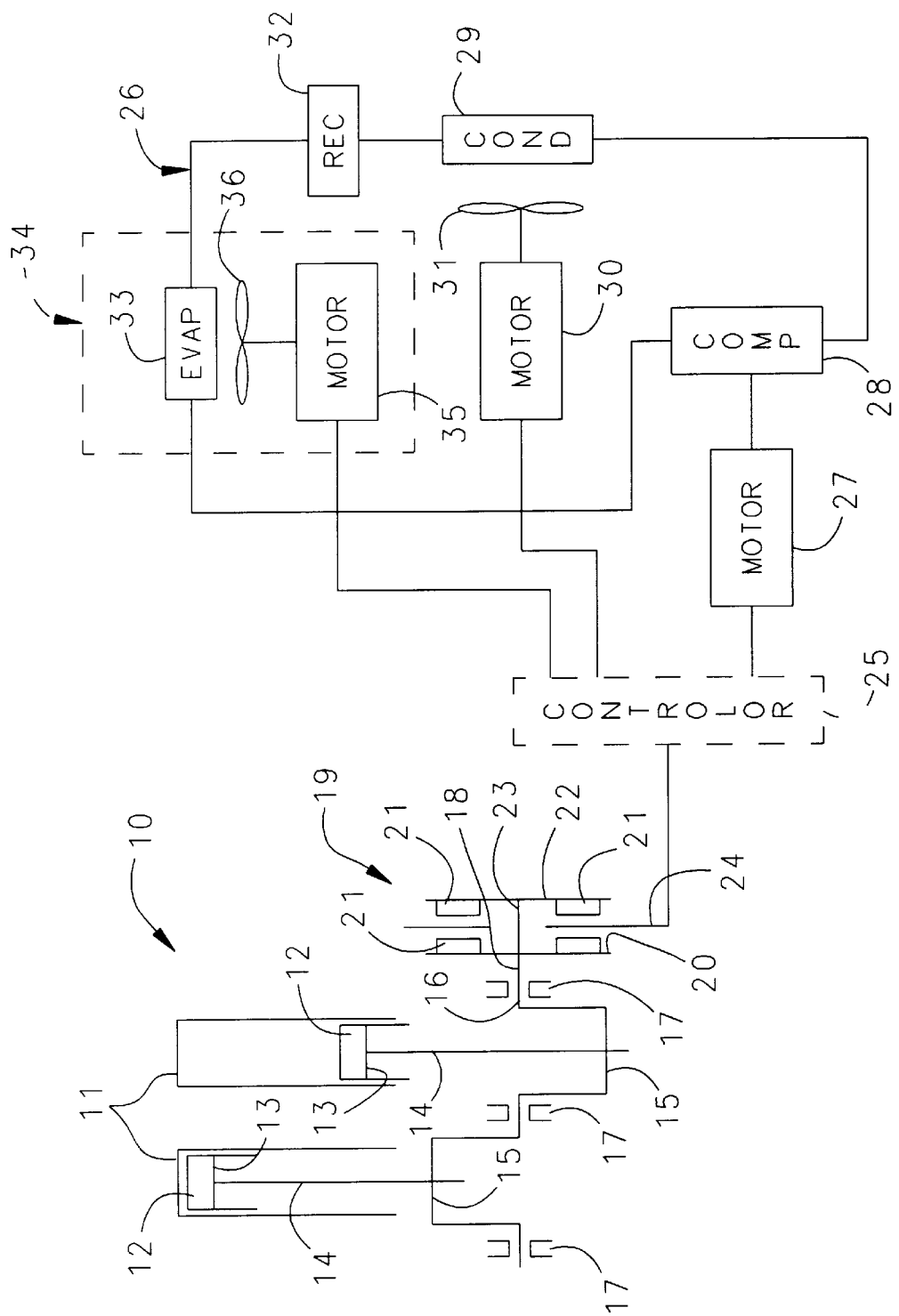
FIG. 1 is a schematic view of an axially compact generator set made according to the invention and shown in one preferred environment of intended use.

An exemplary embodiment of an axially compact generator set made according to the invention is illustrated in the drawings and will be described herein in the environment of a mobile refrigeration unit. However, it is to be understood that the generator set may see use in other environments as well.

Referring to FIG. 1, an internal combustion engine, generally designated 10, and preferably a diesel engine, is seen to include two cylinders 11 in which pistons 12 are reciprocally received. The pistons 12 are connected by wrist pins 13 to connecting rods 14 which in turn are connected to cranks 15 on the engine main shaft 16. Main journal bearings 17 on each side of each crank 15 journal the main shaft 16 for rotation about an axis.

At one end 18 of the main shaft 16, an axial gap generator, generally designated 19, is provided. In general terms, the generator 19 includes the engine flywheel 20 which mounts permanent magnets 21. The flywheel 20 is a ferromagnetic disc and a similar disc 22 is axially spaced from the flywheel 20 and also mounts permanent magnets 21. The disc 22 is coupled by a shaft section 23 to the flywheel 21 so that the disc 22 rotates with the flywheel 20. Interposed between the two sets of permanent magnets is a stator 24 having windings (not shown in FIG. 1) in which electrical current is induced. The current thus generated is provided to a control circuit 25 of conventional construction to operate, for example, a mobile refrigeration unit, generally designated 26.

As will be seen, the generator 19 preferably is a polyphase generator, specifically, a three-phase generator and via the control circuit 25, provides electrical power to a three-phase motor 27 which drives a refrigerant compressor 28. The refrigerant condenser 29 is adapted to receive compressed refrigerant from the compressor 28. A motor 30 driving a fan 31 flows air through the condenser 29 to cool the refrigerant therein to cause the same to condense.

Condensed refrigerant from the condenser is passed on to a dryer/receiver 32 and ultimately to an evaporator 33 within a compartment 34 such as a trailer, to cool the contents. In such instances, an additional motor 35 may be coupled, like the motor 30, to the control circuit 25. The motor 35 may drive a fan 36 for forcing air through the evaporator 33 into the compartment 34 to cool the contents of the same.

It should be noted that in some instances, the motor 35 and fan 36 may be omitted in favor of the use of coils lining the compartment 34 as is well known.

Figure 2:
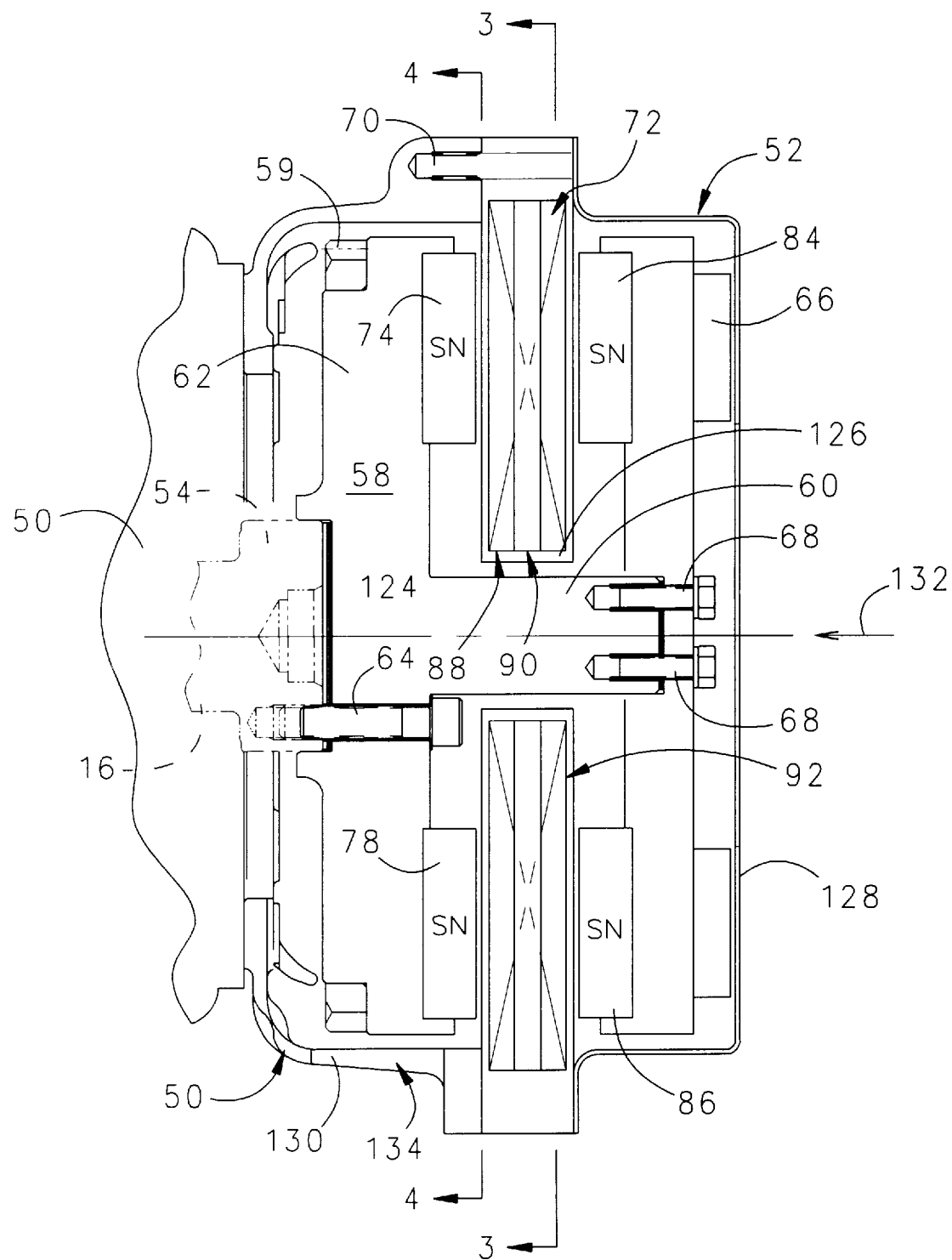
FIG. 2 is an enlarged, fragmentary, sectional view of part of the engine and the entirety of the generator.
Figure 3:
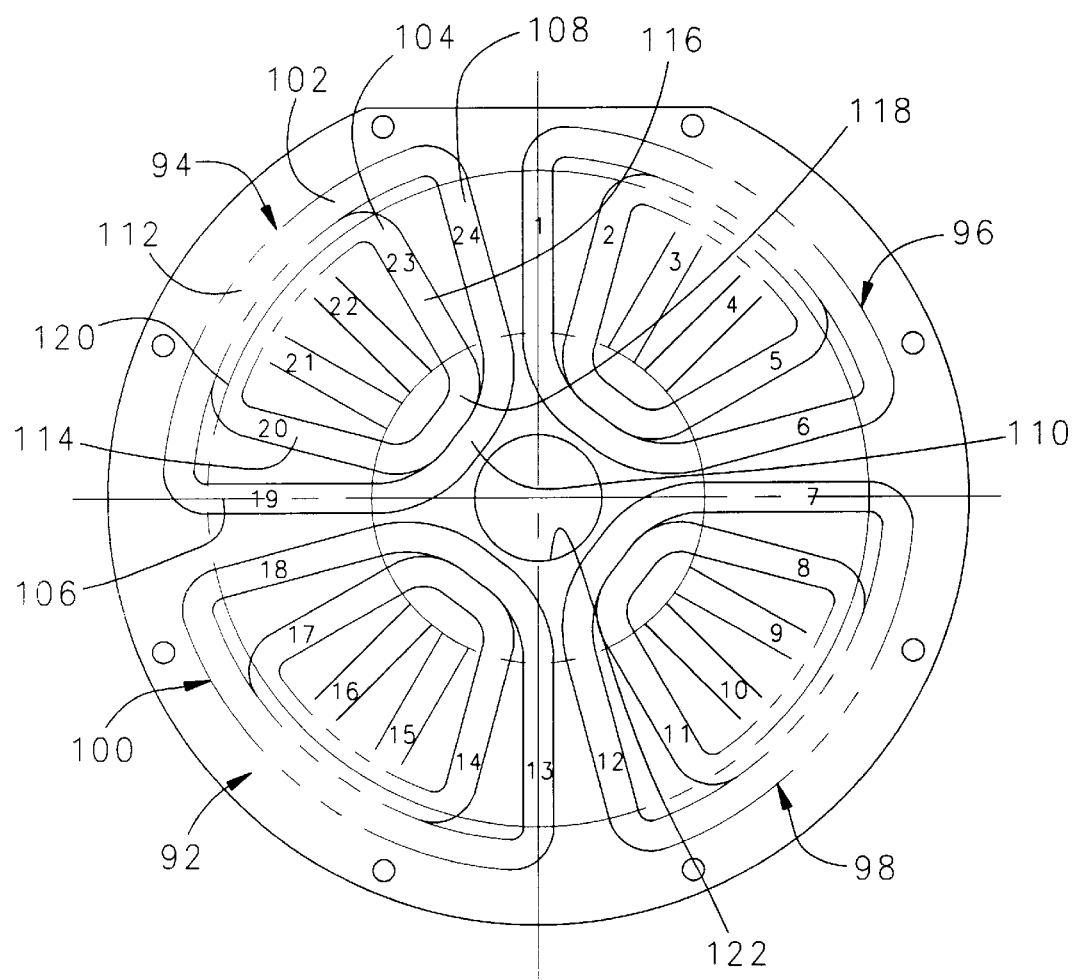
FIG. 3 is a sectional view taken approximately along the line 3—3 in FIG. 2.
Figure 4:
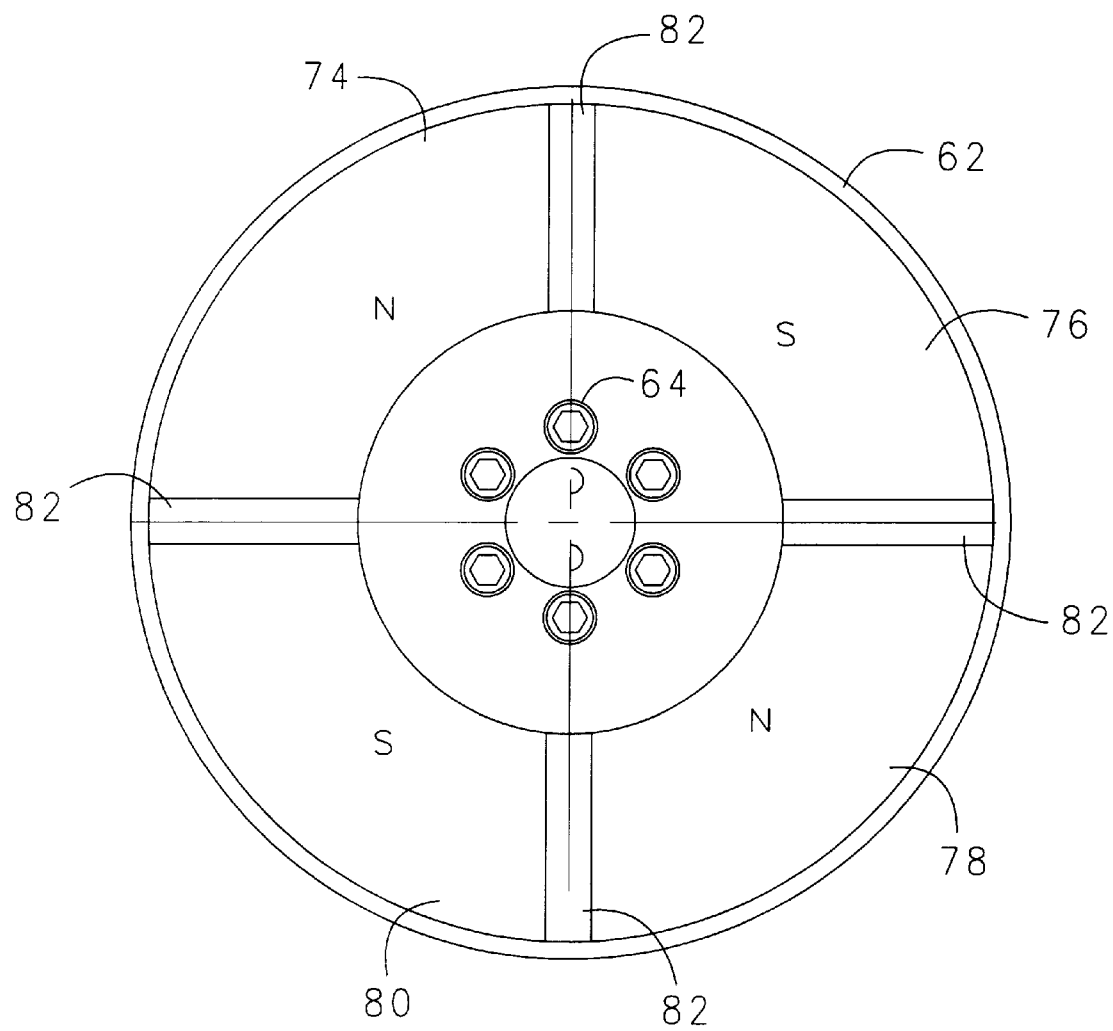
FIG. 4 is a sectional view taken approximately along the line of 4—4 in FIG. 2.

Turning now to FIGS. 2–4, inclusive, the generator 19 will be described in greater detail.

The generator is seen to include a bell-shaped casting, generally designated 50, serving as part of a housing. A stamped, cup-like cover generally designated 52, may also serve as part of the housing well. The main shaft end 18 includes a flange 54. The bearings 17 (FIG. 1) journal the shaft 16 for rotation (as previously described) about an axis 56 that extends through the housing 50,52. Within the housing 50,52, a disc 58 is located. The disc 58 includes a stub shaft end 60. The disc 58 will be made of a ferromagnetic material. Bolts 64 may be employed to couple the disc 58 to the shaft flange 54 for rotation therewith. The disc 58 has sufficient mass to serve as the flywheel 20 of the engine 10 and carries a ring gear 59 which may be engaged by a starter motor for starting the engine 10.

A generally cylindrical disc 66, also of ferromagnetic material, may be coupled by bolts 68 to the stub shaft end 60. Bolts 70 extending between the housing cover 52 and bell casting 50 sandwich a donut-like stator, generally designated 72, to locate the same within the housing thus defined and between the disc 58 and the disc 66. The stator 72 is generally transverse to the axis 56.

Referring to FIGS. 2 and 4, the disc 58 carries four arcuate permanent magnets 74, 76, 78 and 80. The magnets 74, 76, 78 and 80 are separated from one another by small gaps 82 and are arranged such that the south poles of the magnets 74 and 78 face axially toward the disc 58 while the north poles of such magnets face axially toward the stator 72. The north poles of the magnets 76 and 80 will face the disc 58 while the south poles thereof will face the stator 72.

Similar magnets, only two of which are shown at 84 and 96, are mounted on the disc 66. The magnets on the disc 66 are arranged so that their south poles are axially aligned with and face the north poles of the magnets 74 and 78 and the two magnets on the disc 66 that are not shown have their north poles aligned with and facing the magnets 76 and 80.

As generally alluded to previously, a preferred embodiment of the invention envisions a three-phase machine. As seen in FIG. 2, the stator 72 includes three sets of windings, generally designated 88, 90 and 92, one for each of the three phases. The stator 72 may be ironless with the windings 88, 90 and 92 potted or encapsulated in any suitable non-metallic matrix. However, it is also possible to locate the winding 88, 90 and 92 in an iron support if desired.

Referring to FIG. 3, the winding set 92 will also be described in detail. In this regard, it is to be understood that each of the winding sets 88, 90 and 92 are identical but are located within the stator 72 to be angularly spaced by 120° from each of the other sets 88, 90, 92.

Each of the winding sets 88, 90 and 92 is made up of four groups of windings, including a first group, generally designated 94, a second group, generally designated 96, a third group, generally designated 98, and a fourth group, generally designated 100. Each group 94, 96, 98, 100 in turn is made up of first and second winding loops 102 and 104, respectively. The winding loop 102 includes two angularly spaced, radially extending runs 106, 108 each made up of multiple conductors. The runs 106, 108 are connected at their radially inner ends by an end turn 110 and at their radially outer ends by an end turn 112. The second loop 104 is made up of radially extending runs 114 and 116 which are angularly spaced from one another. The radially inner ends of the runs 114 and 116 are connected by a radially inner end turn 118 while the radially outer ends are connected by a radially outer end turn 120. It is to be particularly noted that the runs 114, 116 and end turns 118, 120 of the second loop are wholly within the runs 106, 108 and end turns 110, 112 of the first loop 102 with the inner and outer end turns of each in substantial abutment with one another. This construction allows the loops 102 and 104 to be in a common plane to provide for axial compactness.

Each of the sets 88, 90, 92 includes an open center 122 through which the stub shaft end 60 extends. As a consequence, it will be appreciated that the stator 72 is separated from the magnets 74, 76, 78, 80, 84, 86 by small axial air gaps 124 (FIG. 2).

In addition, a small radial gap 126 is located between the openings 122 and the outer diameter of the stub shaft end 60.

Desirably, an opening 128 is located in the housing element 52. A series of openings 130 may be located about the bell casting 50. Cooling air may enter the opening 128 in the direction of an arrow 132 and then exit the apparatus via the openings 130 in the direction of an arrow 134.

Figure 5:
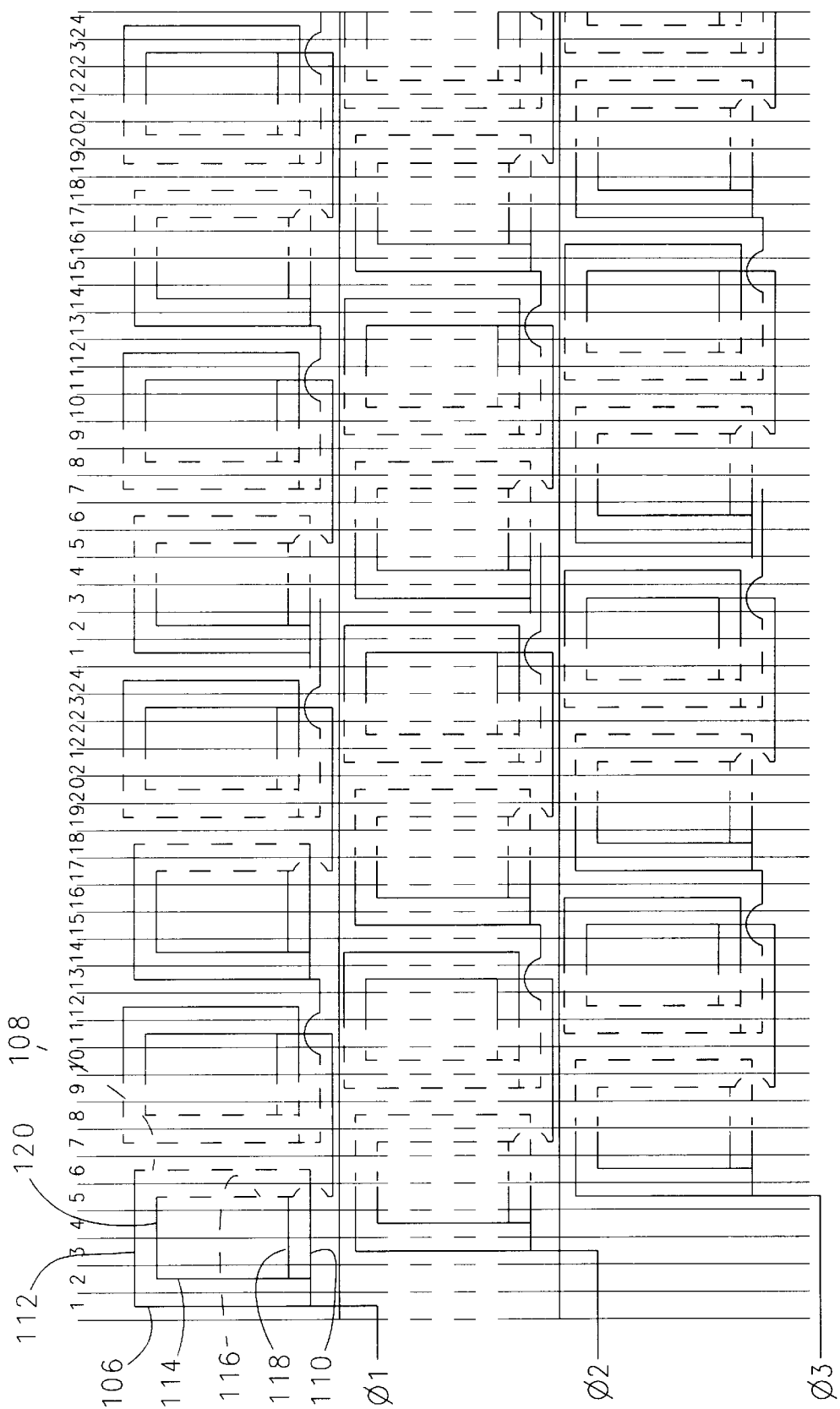
FIG. 5 is a schematic showing the interconnection of the various windings of the generator.

It will be observed that the various runs of the various windings are given numbers from 1 to 24 in FIG. 3. These numbers correspond to the numbers illustrated in FIG. 5 which illustrates the electrical interconnection of each of the winding loops 102, 104 in each of the winding sets 88, 90, 92.

From the foregoing, it will be appreciated that the generator 19 of the invention is extremely axially compact, adding to the length of the engine itself only the thickness of the stator 72 and the thickness of the housing cover 52. This is achieved in part through the use of the flywheel 20 and the magnets mounted thereon as rotating components of the generator. That is to say, the invention integrates engine components and generator components to achieve axially compactness.

And in this regard, it is to be noted that this integration shortens the length of the generator to the point where it is not necessary to provide journal bearings for the rotating generator components that are most remote from the engine. That is to say, the shortness of the generator achieved through integrating the same with the engine allows the engine to main shaft bearings to also act as the journal bearings for all rotating components of the generator. Consequently, journal bearings required in generator sets employing radial gap generators and required to journal one or both ends of the radial gap rotor are eliminated entirely to provide for simplicity and, more importantly, achieve a further reduction in axial length.

What is claimed is:

1. An axially compact generator set comprising:
   an internal combustion engine having a main shaft journalled for rotation about an axis and having an end;
   a flywheel on said end;
   a first rotatable magnet assembly having axially facing poles on said flywheel;
   a stator including generator windings adjacent to said first magnet assembly; and
   a second rotatable magnet assembly on the side of said stator opposite to said first rotatable magnet assembly and adjacent to said stator, said second magnet assembly having axially facing poles directed toward the poles on said first magnet assembly and being coupled to said first magnet assembly for rotation therewith.

2. The axially compact generator set of claim 1 wherein said engine has main bearings journalling said main shaft, said main bearings further serving to journal said flywheel and said first and second magnet assemblies.

3. The axially compact generator set of claim 1 wherein said magnet assemblies are made up of permanent magnets.

4. The axially compact generator set of claim 1 wherein said stator generator windings define a polyphase machine.

5. The axially compact generator set of claim 1 wherein said flywheel includes a starter gear.

6. A refrigeration system including the axially compact generator set of claim 1 and further including an electrically driven, refrigerant compressor electrically coupled to said stator, a refrigerant condenser connected to said compressor to receive compressed refrigerant therefrom and an electrically driven fan for driving air through the condenser and electrically coupled to said stator.

7. An axially compact generator set comprising:
   an internal combustion engine having a main shaft journalled by main bearings for rotation about an axis, and said shaft having an end;
   a generally cylindrical ferromagnetic disc mounted on said end and extending radially outwardly therefrom;
   said disc having sufficient mass to act as the flywheel of said engine;
   a plurality of permanent magnets carried by said disc and having north and south poles facing in axially opposite directions with dissimilar poles of adjacent magnets facing in the same direction;
   a stator axially spaced from but adjacent to said disc and separated from said permanent magnets by an axial air gap; and
   a plurality of electrical windings on said stator and disposed in a common plane.

8. The axially compact generator set of claim 7 wherein there are two said discs axially spaced from one another with said stator located between said discs, each of said discs carrying a plurality of said permanent magnets with the poles on one of the discs aligned with and facing the opposite poles of the magnets on the other disc.

9. The axially compact generator set of claim 8 wherein said stator has a generally central opening, said discs being coupled to one another through said central opening.

10. The axially compact generator set of claim 8 wherein said engine is a diesel engine.

11. The axially compact generator set of claim 7 further including a bell housing secured to said engine and housing said disc, said stator being mounted on said bell housing.

12. The axially compact generator set of claim 11 further including a housing cover mounted on said bell housing.

* * * * *